(12) United States Patent
England et al.

(10) Patent No.: US 9,016,928 B1
(45) Date of Patent: Apr. 28, 2015

(54) EDDY CURRENT MINIMIZING FLOW PLUG FOR USE IN FLOW CONDITIONING AND FLOW METERING

(71) Applicant: The United States of America as represented by the Administrator of the National Aeronautics and Space Administration, Washington, DC (US)

(72) Inventors: John Dwight England, Arab, AL (US); Anthony R. Kelley, Somerville, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 329 days.

(21) Appl. No.: 13/729,861

(22) Filed: Dec. 28, 2012

Related U.S. Application Data

(63) Continuation of application No. 12/508,122, filed on Jul. 23, 2009, now abandoned.

(51) Int. Cl.
*B01F 5/00* (2006.01)
*F16L 55/027* (2006.01)
*B01F 5/06* (2006.01)

(52) U.S. Cl.
CPC ............ *F16L 55/027* (2013.01); *B01F 5/0613* (2013.01); *B01F 5/0644* (2013.01); *B01F 5/064* (2013.01)

(58) Field of Classification Search
CPC ....... B01F 5/0613; B01F 5/064; B01F 5/0644
USPC ..................... 366/336, 337, 338, 340; 138/40
See application file for complete search history.

(56) References Cited

U.S. PATENT DOCUMENTS

| | | | | |
|---|---|---|---|---|
| 67,614 | A * | 8/1867 | Trees ................................ | 138/39 |
| 1,143,631 | A * | 6/1915 | Keller et al. ................ | 73/861.63 |
| 1,454,196 | A * | 5/1923 | Trood .......................... | 48/189.4 |
| 1,466,006 | A * | 8/1923 | Trood .......................... | 48/189.4 |
| 1,648,708 | A * | 11/1927 | Wilkinson ................. | 73/861.63 |
| 1,678,225 | A * | 7/1928 | Kincade ....................... | 366/338 |
| 1,702,274 | A * | 2/1929 | Schmidt ......................... | 138/40 |
| 2,048,613 | A * | 7/1936 | McKee .......................... | 55/418 |
| 2,618,925 | A * | 11/1952 | Wislicenus .................... | 60/767 |
| 2,760,371 | A * | 8/1956 | Borden ....................... | 73/861.63 |
| 2,925,830 | A * | 2/1960 | Kautrowitz ..................... | 138/37 |
| 2,959,916 | A * | 11/1960 | Carlton et al. .................. | 138/40 |
| 2,995,007 | A * | 8/1961 | Randolph ....................... | 138/40 |
| 3,128,794 | A * | 4/1964 | Boucher et al. ................. | 138/37 |
| 3,671,208 | A * | 6/1972 | Medsker ...................... | 48/180.1 |
| 3,792,839 | A * | 2/1974 | Gidge ............................. | 366/87 |

(Continued)

*Primary Examiner* — Tony G Soohoo
(74) *Attorney, Agent, or Firm* — Peter J. Van Bergen; James J. McGroary

(57) ABSTRACT

An eddy-current-minimizing flow plug has an outer radial wall with open flow channels formed between the plug's inlet and outlet. The plug has a central region coupled to the inner surface of the outer radial wall. Each open flow channel includes (i) a first portion originating at the inlet and converging to a location in the plug where convergence is contributed to by changes in thickness of the outer radial wall and divergence of the central region, and (ii) a second portion originating in the plug and diverging to the outlet where divergence is contributed to by changes in thickness of the outer radial wall and convergence of the central region. For at least a portion of the open flow channels, a central axis passing through the first and second portions is non-parallel with respect to the given direction of the flow.

10 Claims, 3 Drawing Sheets

(56) References Cited

U.S. PATENT DOCUMENTS

| | | | |
|---|---|---|---|
| 4,099,268 A * | 7/1978 | Luthi | 366/338 |
| 4,208,136 A * | 6/1980 | King | 366/338 |
| 4,541,982 A * | 9/1985 | Upmeier | 264/349 |
| 4,808,007 A * | 2/1989 | King | 366/337 |
| 4,886,086 A * | 12/1989 | Etchells et al. | 137/1 |
| 5,814,738 A * | 9/1998 | Pinkerton et al. | 73/861.55 |
| 6,579,001 B2 * | 6/2003 | Krumbock et al. | 366/91 |
| 7,198,400 B2 * | 4/2007 | Unterlander et al. | 366/336 |
| 7,753,080 B2 * | 7/2010 | Liu et al. | 138/39 |
| 7,954,514 B2 * | 6/2011 | Tung et al. | 138/37 |
| 8,042,989 B2 * | 10/2011 | Gordon et al. | 366/176.1 |
| 8,132,961 B1 * | 3/2012 | England et al. | 366/340 |
| 2002/0126568 A1 * | 9/2002 | Krumbock et al. | 366/91 |
| 2005/0039809 A1 * | 2/2005 | Speldrich | 138/39 |
| 2010/0104705 A1 * | 4/2010 | Gordon et al. | 426/238 |

* cited by examiner

EDDY CURRENT MINIMIZING FLOW PLUG FOR USE IN FLOW CONDITIONING AND FLOW METERING

CROSS-REFERENCES TO RELATED APPLICATIONS

This application is a continuation application of U.S. patent application Ser. No. 12/508,122, filed on Jul. 23, 2009.

ORIGIN OF THE INVENTION

The invention was made by employees of the United States Government and may be manufactured and used by or for the Government for governmental purposes without the payment of any royalties.

BACKGROUND OF THE INVENTION

1. Field of the Invention

This invention relates to flow conditioners and flow meters. More specifically, the invention is a flow plug that minimizes eddy currents in the flow downstream of the plug.

2. Description of the Related Art

There are numerous applications utilizing fluid flow in a conduit where a flow must be conditioned or one or more process variables associated with a fluid flow (e.g., pressure, temperature, mass flow, etc.) must be measured. "Flow conditioners" include simple orifice plates. To measure a variety of flow process variables, a variety of "flow meters" have been developed. Flow meters having no moving parts or power requirements are preferred.

Some flow meters include an orifice plate disposed in a fluid flow. The orifice plate (i.e., a plate with a single hole or multiple holes passing therethrough) is typically used to condition a flow before and/or after flow measurement instrumentation. However, this often requires some type of disruption of the flow where the flow measurement instrumentation (e.g., pitot tubes, spinning fans, etc.) is positioned. Furthermore, multi-hole orifice plates of varying hole placement and size can have a high coefficient of discharge. However, in such cases, permanent pressure loss varies widely depending on the pattern of holes. Still further, orifice plates can produce eddy currents in the downstream region of the flow. Such eddy currents can cause vibrations that generate noise and, in extreme cases, cause equipment damage.

SUMMARY OF THE INVENTION

Accordingly, it is an object of the present invention to provide a flow plug that conditions a fluid flow in a way that minimizes eddy currents downstream of the flow plug.

Another object of the present invention is to provide an eddy-current-minimizing flow plug that can be used for flow conditioning and/or flow metering purposes.

Still another object of the present invention is to provide an eddy-current-minimizing flow plug having no moving parts.

Other objects and advantages of the present invention will become more obvious hereinafter in the specification and drawings.

In accordance with the present invention, an eddy-current-minimizing flow plug has a plug fitted in a conduit for supporting a fluid flow therethrough in a given direction. The plug has an outer radial wall formed with an inner surface wherein a thickness of the outer radial wall is defined. The plug further has an inlet and an outlet with a plurality of open flow channels being formed between the inlet and outlet. The inlet defines a first plane of incidence for the fluid flow entering the plug while the outlet defines a second plane of incidence for the fluid flow exiting the plug. The plug further includes a central region coupled to the inner surface of the outer radial wall with the central region forming at least a portion of each open flow channel. Each open flow channel includes (i) a first portion that originates at the inlet and converges to a location within the plug that is downstream of the inlet wherein convergence of the first portion is contributed to by changes in thickness of the outer radial wall and divergence of the central region, and (ii) a second portion that originates within the plug and diverges to the outlet wherein divergence of the second portion is contributed to by changes in thickness of the outer radial wall and convergence of the central region. The plug is devoid of planar surface regions (i) at each of the inlet and outlet, and (ii) in any fluid flow plane thereof that is perpendicular to the given direction of the flow. For at least a portion of the open flow channels, a central axis passing through the first portion and second portion is non-parallel with respect to the given direction of the flow.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

The present invention is a flow plug that can be used to condition a flow such that eddy currents downstream of the flow plug are reduced or minimized. The flow plug can also be used in the measurement of process variables associated with a flow. The flow plug of the present invention reduces/minimizes the production of eddy currents in the flow region that is downstream of the plug to thereby reduce the associated vibrations and noise, and reduce permanent pressure loss. In general, the flow plug of the present invention defines open flow passages or channels therethrough with the plug being installed in a fluid-carrying conduit such that the fluid passes through the plug's flow channels. All fluid flowing through conduit must pass through the plug's flow channels. As used herein, the term "plug" includes any structural element that satisfies the constraints that will be described herein. The flow plug can be used to condition a fluid flow such that flow measurements upstream and/or downstream of the plug are facilitated. However, the flow plug can also be configured for instrumentation such that fluid properties are measured as the flow moves through the plug. The flow plug is readily compatible with existing fittings and current measurement systems and, therefore, does not require special piping, instrumentation, or calculation method changes.

The term "fluid" as used herein refers to any flowable substance to include vapors or gas, homogenous or non-homogenous liquids and slurries. In general, a pipe or conduit will have a flow plug of the present invention fitted therein. A fluid flow moving through the conduit will impinge on the upstream side of the flow plug that is positioned transverse or perpendicular to the fluid flow. The flow plug of the present invention can be shaped to conform to a straight or curved portion of a conduit without departing from the scope of the present invention.

The flow plug can be sized/shaped to work with any size/shape of conduit. For example, the flow plug can be constructed for installation in a cylindrical conduit, a conduit having a rectangular cross-section, a straight conduit, a shaped or curved conduit, etc. Thus, in general, the flow plug can be shaped/sized to fit within any fluid-carrying conduit without departing from the scope of the present invention. Further, the term "plug" as used herein includes a simple element fitted into a conduit, and can include a flanged element fitted between the ends of two joined conduits, between two flared pipe fittings, welded in place, etc., where the flanged element has a plug portion that fills an interior cross-section of the two joined conduits.

Figure 1:
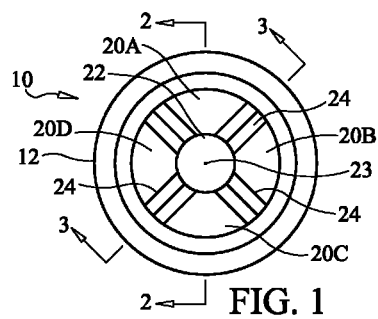
FIG. 1 is an end view of a flow plug having a plurality of open flow channels configured for minimizing eddy currents in accordance with an embodiment of the present invention.
Figure 2:
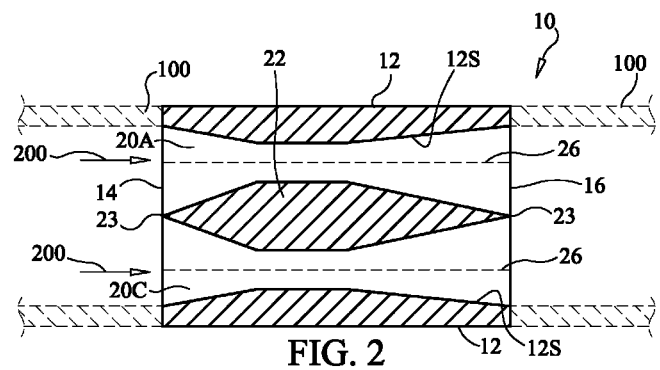
FIG. 2 is an axial cross-sectional view of the flow plug taken along line 2-2 in FIG. 1.
Figure 3:
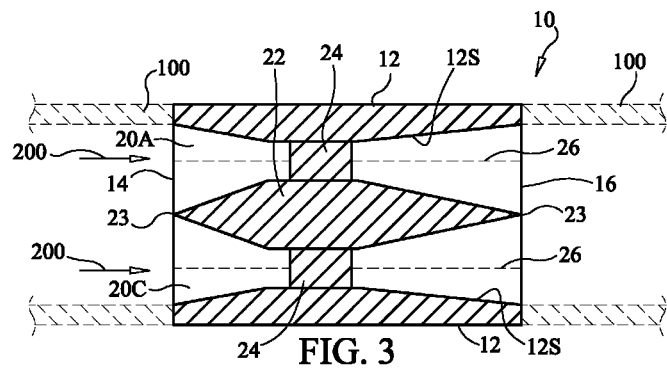
FIG. 3 is an axial cross-sectional view of the flow plug taken along line 3-3 in FIG. 1.

Referring now to the drawings with simultaneous reference to FIGS. 1-3, an end view and two cross-sectional views of a flow plug in accordance with an embodiment of the present invention are shown and are referenced generally by numeral 10. In the illustrated embodiment, plug 10 is configured for placement in a straight cylindrical conduit 100 referenced by dashed lines in FIGS. 2 and 3. Plug 10 can be configured to be sealed/integrated with conduit 100 as shown, or can include an annular flange captured between two conduit sections as would be understood by one of ordinary skill in the art. The particular choice of mounting plug 10 in conduit 100 is not a limitation of the present invention.

Plug 10 has an outer radial wall 12, an inlet face 14, and an outlet face 16. Outer wall 12 essentially forms a structural continuum with conduit 100. With plug 10 installed in conduit 100, inlet face 14 is substantially perpendicular to a fluid flow moving through conduit 100 as indicated by arrows 200. That is, inlet face 14 defines a plane of incidence with fluid flow 200 for plug 10. As will be explained further below, fluid flow 200 moves through defined flow channels in plug 10 before exiting plug 10 at outlet face 16. Similar to inlet face 14, outlet face 16 will be substantially perpendicular to the direction of fluid flow 200 at inlet face 14. In other words, inlet face 14 and outlet face 16 define parallel planes for plug 10 in straight conduit 100. Note that the inlet and outlet faces of a shaped or curved plug constructed in accordance with the present invention will not lie in parallel planes.

Between inlet face 14 and outlet face 16, plug 10 defines a number of open flow channels for fluid flow 200 moving through plug 10. In the illustrated embodiment, four such channels 20A-20D are defined within plug 10. However, it is to be understood that the number of channels could be more or less without departing from the scope of the present invention. Each of channels 20A-20D is defined by an inner surface 12S of outer wall 12, a portion of a central region 22, and a portion of two of radial supports 24 that couple central region 22 to outer wall 12. Fore and aft of radial supports 24, channels 20A-20D are contiguous with one another. For simplicity, central region 22 and radial supports 24 are illustrated as solid elements. However, these features could also be hollow without departing from the scope of the present invention.

Each of radial supports 24 is shaped/sized to minimize drag effects on fluid flow 200 while providing the necessary structural support for central region 22. For example, radial supports 24 can be simple cylindrical rods or could be longer in length (i.e., along the direction of fluid flow 200) if more structural strength is required. For such longer length radial supports, the leading and trailing edges (with respect to the direction of fluid flow 200) of such radial supports could be tapered to non-planar leading/trailing edges with respect to the direction of fluid flow 200 moving thereby. The number of radial supports in the flow plug is dependent upon the dynamic parameters of the flow fluid, and is not a limitation of this invention. Radial supports 24 are located in an axial region of plug 10 between inlet face 14 and outlet face 16.

In accordance with the present invention's goal of eddy current minimization, each of channels 20A-20D converges from inlet face 14 and subsequently diverges to outlet face 16. Further, plug 10 is constructed such that there are no planar surfaces at inlet face 14 and outlet face 16, and no planar surfaces at the leading and trailing edges of radial supports 24. That is, in general, the structure of plug 10 presents no planar surfaces in planes that are perpendicular to the direction of fluid flow 200 as fluid flow 200 moves past such planes. In terms of the illustrated embodiment, this means that the inner surface 12S at inlet face 14 and outlet face 16 is aligned (or substantially aligned) with the inside surface 100S of conduit 100. Also, central regions 22 must form a non-planar feature at inlet face 14 and outlet face 16. For example, central region 22 could taper to a pointed tip 23 (as shown) at each of inlet face 14 and outlet face 16. Another possibility is for central region 22 to taper to a linear edge at inlet face 14 and outlet face 16. Accordingly, it is to be understood that the particular feature formed by central region 22 at inlet face 14 and outlet face 16 is not a limitation of the present invention.

Although not a requirement of the present invention, each of flow channels 20A-20D has a central axis (referenced by dashed lines 26) that is substantially parallel to the direction of fluid flow 200 at inlet face 14. In this way, plug 10 is configured primarily for eddy current minimization. However, as will be explained further below, the present invention can also be configured to provide additional forms of flow conditioning such as mixing.

Figure 4:
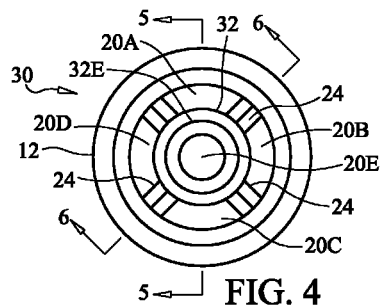
FIG. 4 is an end view of a flow plug having a plurality of open flow channels configured for minimizing eddy currents in accordance with another embodiment of the present invention.
Figure 5:
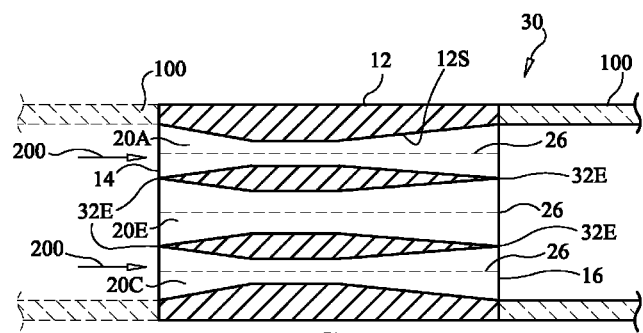
FIG. 5 is an axial cross-sectional view of the flow plug taken along line 5-5 in FIG. 4.
Figure 6:
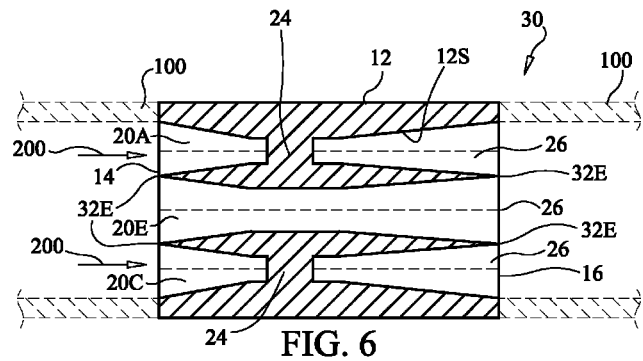
FIG. 6 is an axial cross-sectional view of the flow plug taken along line 6-6 in FIG. 4.

Another embodiment of the present invention is illustrated in FIGS. 4-6 where flow plug 30 has its central region 32 defining another open flow channel 20E extending from inlet face 14 to outlet face 16. Similar to the previous embodiment, central region 32 is coupled to outer wall 12 by radial supports 24. However, since central region 32 now defines flow channel 20E, central region 32 tapers to a non-planar annular edge 32E at each of inlet face 14 and outlet face 16. Similar to the previous embodiment, each of flow channels 20A-20E has a central axis 26 that is substantially parallel to the direction of fluid flow 200 at inlet face 14.

Figure 7:
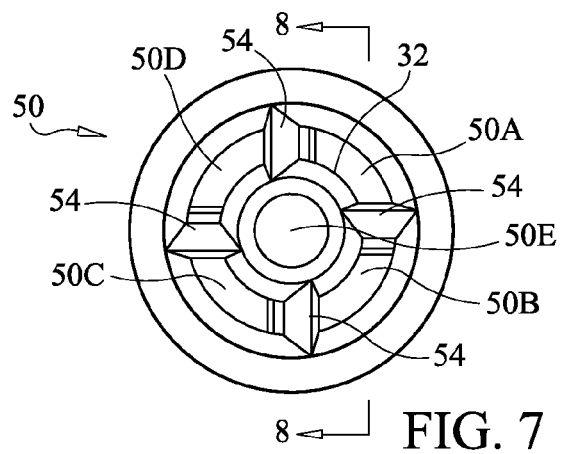
FIG. 7 is an end view of a flow plug having a plurality of open flow channels with common longitudinal axes that are non-parallel with respect to an incoming fluid flow in accordance with an embodiment of the present invention.
Figure 8:
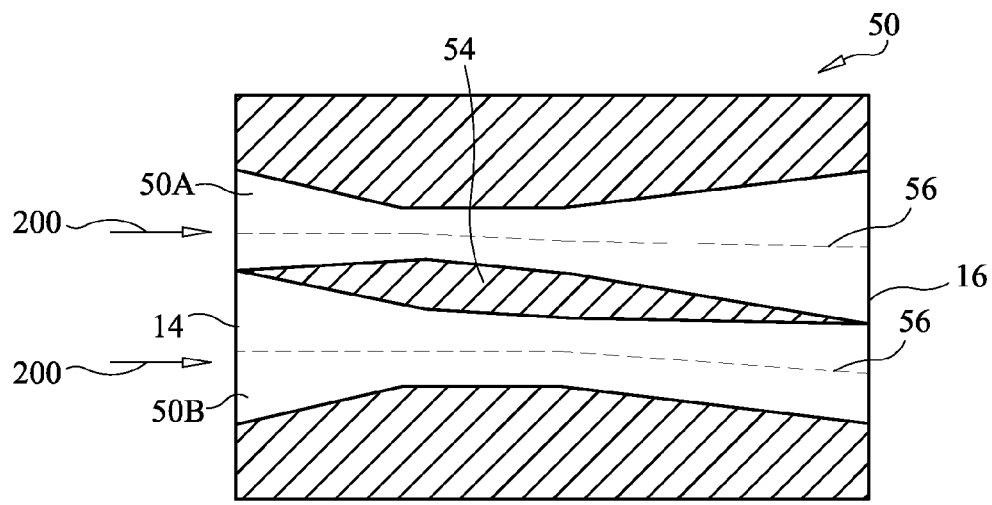
FIG. 8 is an axial cross-sectional view of the flow plug taken along line 8-8 in FIG. 7.

As mentioned above, the central axis of one or more open flow channels defined by a flow plug of the present invention need not be parallel to the direction of the incoming fluid flow at the plug's inlet face. One such embodiment is illustrated in FIGS. 7 and 8 where FIG. 7 presents an end view of a flow plug 50 and FIG. 8 presents a cross-sectional view of flow plug 50 illustrating the non-parallel nature of the open flow channels in plug 50. Plug 50 includes a central region 32 that is configured in the same fashion as described above for plug 30 such that flow channel 50E is defined. However, in this embodiment, radial supports 54 are used to create open flow channels 50A-50D where the central axis 56 of each channel is not parallel to the direction of the fluid flow 200 incident on inlet face 12. That is, each of radial supports 54 extends from inlet face 14 to outlet face 16 and is shaped along its length to create the non-parallel flow channel. In accordance with the present invention, the end feature defined by each radial support 54 at inlet face 14 and outlet face 16 is non-planar, such as the linear edge illustrated. The shape of the radial supports 54 and resulting flow channels can be designed to control a flow condition in addition to eddy current reduction or minimization. For example, radial supports 54 could be shaped such that the resulting flow channels/central axes define a helical path through plug 50 in order to promote mixing as the fluid flow exits outlet face 16.

The flow plug of the present invention can be used "as is" to simply reduce/minimize eddy currents downstream of the flow plug and, if desired, further condition, mix, or induce swirl in a fluid flow. However, the flow plug can also be "instrumented" with one or more sensors (e.g., temperature sensors, pressure sensors, etc.) in order to facilitate the measuring of process variables associated with the fluid flow. To do this, one or more radially-extending holes or ports can be drilled into the flow plug with each such radial hole extending to a flow channel defined by the flow plug as described earlier herein. A sensor of choice can then be mounted flush with the sidewall of a flow channel.

Figure 9:
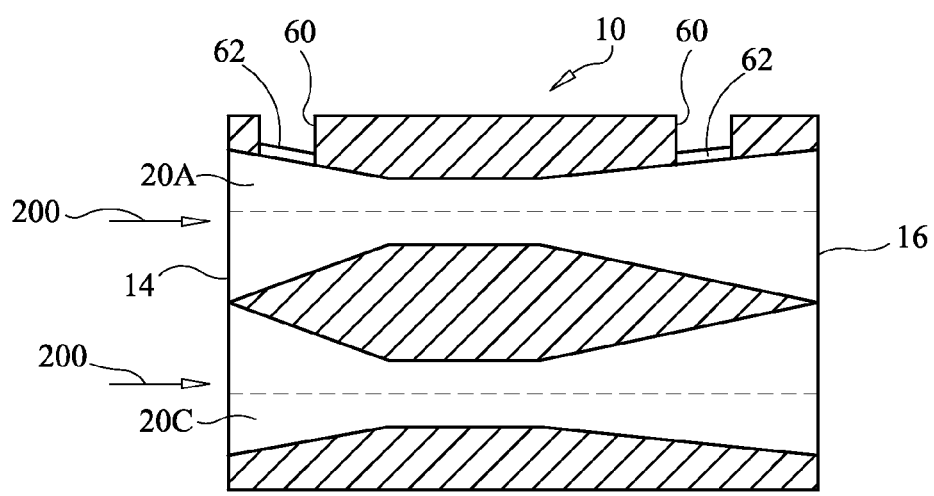
FIG. 9 is an axial cross-sectional view of a flow plug configured with sensor ports and sensors in accordance with another embodiment of the present invention.

By way of example, FIG. 9 illustrates flow plug 10 further configured with sensors. Radial ports 60 (e.g., two are shown) leading from a radial perimeter of plug 10 through outer wall 12 and to (for example) flow channel 20A. It is to be understood that additional radial ports can be provided as needed for coupling to flow channel 20A and/or additional ones of the flow channels. A sensor 62 can be mounted at the juncture of radial port 60 with flow channel 20A. Sensor 62 is typically positioned to be flush with a portion of plug 10 that defines flow channel 20A, but may be mounted at any point along the radial port. Sensor 62 is typically a temperature or pressure sensor. However, it is to be understood that sensor 62 is not so limited as sensor 62 can be optical, magnetic, stress, strain, acceleration, density, graduated flow switch, acoustic, coriolis sensors, etc., without departing from the scope of the present invention.

Multiple ports/sensors can be used to establish measurement points anywhere along one or more of the plug's flow channels. The location of the sensors in a flow channel can be critical for measurement due to velocity profile changes and entrance effects. The location of the sensors must also account for the area change ratio for the standard orifice equation. As such, more than one sensor may need to be mounted in the same port. By instrumenting flow plug 10 in this fashion, measurement hardware is kept completely out of the flow field. Note that traditional measurement schemes can also be combined with measurements made at the flow plug. Such traditional measurement schemes typically utilize measurements made upstream and/or downstream of the flow plug.

The above-described radial port(s) can also be used to draw or pump another fluid into a plug's flow channels for mixing with fluid flow 200. More specifically, an empty port 60 would have a vacuum created therein under certain conditions as fluid flow 200 moves through plug 10. This vacuum can be used to draw another fluid into the plug's respective flow channel coupled to the empty port. The additional fluid could also be pumped through an empty port 60 and into the plug's respective flow channel. Still further, when multiple radial ports 60 are provided, one or more could be instrumented with sensors and one or more could be left empty.

The advantages of the present invention are numerous. The flow plug's essentially zero planar surfaces in planes perpendicular to the direction of fluid flow, combined with its converging-to-diverging flow channels has been found to reduce or minimize eddy currents downstream of the flow plug.

Although the invention has been described relative to specific embodiments thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A flow plug for minimizing eddy currents, comprising:
a plug adapted to be fitted in a conduit and supporting a fluid flow therethrough in a given direction, said plug having an outer radial wall formed with an inner surface wherein a thickness of said outer radial wall is defined, said plug further having an inlet and an outlet with a plurality of open flow channels being formed between said inlet and said outlet, said inlet defining a first plane of incidence for the fluid flow entering said plug, said outlet defining a second plane of incidence for the fluid flow exiting said plug,
said plug further including a central region thereof coupled to said inner surface of said outer radial wall and forming at least a portion of each of said open flow channels,
each of said open flow channels including (i) a first portion that originates at said inlet and converges to a location within said plug that is downstream of said inlet wherein convergence of said first portion is contributed to by changes in said thickness of said outer radial wall and divergence of said central region, and (ii) a second portion that originates within said plug and diverges to said outlet wherein divergence of said second portion is contributed to by changes in said thickness of said outer radial wall and convergence of said central region,
said plug being devoid of planar surface regions (i) at each of said inlet and said outlet, and (ii) in any fluid flow plane thereof that is perpendicular to the given direction, and
wherein, for at least a portion of said open flow channels, a central axis passing through said first portion and said second portion is non-parallel with respect to the given direction.

2. A flow plug as in claim 1, further comprising at least one port formed in said plug, each said port having an origination at an exterior surface of said outer radial wall and a termination at one of said open flow channels between said inlet and said outlet.

3. A flow plug as in claim 2, further comprising at least one sensor mounted in said port.

4. A flow plug as in claim 3, wherein said sensor is located within said port.

5. A flow plug as in claim 3, wherein said sensor is selected from the group consisting of pressure, temperature, optical, magnetic, strain, stress, acceleration, density, graduated flow switch, acoustic, and coriolis sensors.

6. A flow plug for minimizing eddy currents, comprising:
a plug adapted to be fitted in a straight conduit and supporting a fluid flow therethrough in a given direction, said plug having an outer radial wall formed with an inner surface wherein a thickness of said outer radial wall is defined, said plug further having an inlet and an outlet with a plurality of open flow channels being formed between said inlet and said outlet, said inlet defining a first plane of incidence for the fluid flow entering said plug, said outlet defining a second plane of incidence for the fluid flow exiting said plug,
said inlet and said outlet defined in parallel planes that are perpendicular to the given direction,
said plug further including a central region thereof coupled to said inner surface of said outer radial wall and forming at least a portion of each of said open flow channels,
each of said open flow channels including (i) a first portion that originates at said inlet and converges to a location within said plug that is downstream of said inlet wherein convergence of said first portion is contributed to by changes in said thickness of said outer radial wall and divergence of said central region, and (ii) a second portion that originates within said plug and diverges to said outlet wherein divergence of said second portion is contributed to by changes in said thickness of said outer radial wall and convergence of said central region,
said plug being devoid of planar surface regions (i) at each of said inlet and said outlet, and (ii) in any fluid flow plane thereof that is perpendicular to the given direction, and
wherein, for at least a portion of said open flow channels, a central axis passing through said first portion and said second portion is non-parallel with respect to the given direction.

7. A flow plug as in claim 6, further comprising at least one port formed in said plug, each said port having an origination at an exterior surface of said outer radial wall and a termination at one of said open flow channels between said inlet and said outlet.

8. A flow plug as in claim 7, further comprising at least one sensor mounted in said port.

9. A flow plug as in claim 7, wherein said sensor is located within said port.

10. A flow plug as in claim 7, wherein said sensor is selected from the group consisting of pressure, temperature, optical, magnetic, strain, stress, acceleration, density, graduated flow switch, acoustic, and coriolis sensors.

* * * * *